US 12,046,972 B2

(12) United States Patent
Ishikawa et al.

(10) Patent No.: US 12,046,972 B2
(45) Date of Patent: Jul. 23, 2024

(54) MOTOR AND STATOR BUS BAR

(71) Applicant: NIDEC CORPORATION, Kyoto (JP)

(72) Inventors: Yuki Ishikawa, Kyoto (JP); Hironobu Kumagai, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 308 days.

(21) Appl. No.: 17/696,862

(22) Filed: Mar. 17, 2022

(65) Prior Publication Data

US 2022/0311301 A1 Sep. 29, 2022

(30) Foreign Application Priority Data

Mar. 29, 2021 (JP) .................. 2021-054549

(51) Int. Cl.
*H02K 3/50* (2006.01)
*H02K 3/28* (2006.01)
*H02K 5/22* (2006.01)

(52) U.S. Cl.
CPC .............. *H02K 3/50* (2013.01); *H02K 3/28* (2013.01); *H02K 5/225* (2013.01); *H02K 2203/09* (2013.01)

(58) Field of Classification Search
CPC ............ H02K 3/50; H02K 3/28; H02K 5/225; H02K 2203/09; H02K 1/16; H02K 3/04; H02K 3/12; H02K 13/00
USPC ........................................... 310/71
See application file for complete search history.

(56) References Cited

U.S. PATENT DOCUMENTS

| | | | | |
|---|---|---|---|---|
| 2013/0113313 A1* | 5/2013 | Ikura | ............ | H02K 3/522 310/71 |
| 2015/0137637 A1* | 5/2015 | Jang | ............ | H02K 3/522 29/598 |
| 2021/0265887 A1* | 8/2021 | Kojima | ............ | H02K 3/505 |
| 2022/0239178 A1* | 7/2022 | Ogawa | ............ | H02K 3/50 |
| 2022/0311301 A1* | 9/2022 | Ishikawa | ............ | H02K 3/28 |
| 2022/0393535 A1* | 12/2022 | Ishikawa | ............ | H02K 3/28 |

FOREIGN PATENT DOCUMENTS

| | | |
|---|---|---|
| JP | 201625745 A | 2/2016 |
| JP | 2020114116 A | 7/2020 |

* cited by examiner

*Primary Examiner* — Ahmed Elnakib
(74) *Attorney, Agent, or Firm* — HAUPTMAN HAM, LLP

(57) ABSTRACT

A motor includes a rotor, a stator, and first and second bus bar disposed on one side in an axial direction of the stator. The stator includes a winding portion including conductor connection bodies in which conductors are connected in series and a stator core having slots through which the conductor connection body passes. The winding portion includes a coil end located on one side in the axial direction of the stator core. The conductor connection body includes first and second ends located at an outermost circumference in the radial direction of the coil end. The first bus bar is connected to the first end. The second bus bar is connected to the second end. The first bus bar is located on one side in the axial direction of the coil end. The second bus bar is located on the radial outside of the coil end.

12 Claims, 9 Drawing Sheets

MOTOR AND STATOR BUS BAR

CROSS-REFERENCE TO RELATED APPLICATIONS

The present invention claims priority under 35 U.S.C. § 119 to Japanese Patent Application No. 2021-054549 filed on Mar. 29, 2021, the entire content of which is incorporated herein by reference.

FIELD OF THE INVENTION

The present invention relates to a motor.

BACKGROUND

A winding structure using a plurality of segment coils is currently studied for the purpose of improving the efficiency of the motor. A bus bar that supplies current to a stator connected to the segment coil is connected to such a motor. Conventionally, a bus bar module disposed on a radial outside of a coil end is known. Because connection portions of the bus bar module are concentrated on the radial outside of the coil end, a connection process is simplified.

In recent years, there has been a demand for higher voltage of the motor, and sometimes a wide bus bar is adopted in accordance with an increase in a current amount. When the wide bus bar is adopted in a conventional structure, the bus bar module becomes larger in the radial direction, and the bus bar module protrudes outside the core back, which leads to an increase in a size of the motor.

SUMMARY

In one aspect of the present invention, an exemplary motor includes a rotor that is rotatable about the center axis line, a stator disposed on a radial outside of the rotor, and a first bus bar and a second bus bar that are disposed on one side in an axial direction of the stator. The stator includes a winding portion including a plurality of conductor connection bodies in which a plurality of conductors are connected in series and a stator core in which a plurality of slots through which the conductor connection body passes are provided. The winding portion includes a coil end located on one side in the axial direction of the stator core. The conductor connection body includes a first end and a second end that are located at an outermost circumference in the radial direction of the coil end. The first bus bar is connected to the first end. The second bus bar is connected to the second end. The first bus bar is located on one side in the axial direction of the coil end. The second bus bar is located on the radial outside of the coil end.

The above and other elements, features, steps, characteristics and advantages of the present disclosure will become more apparent from the following detailed description of the preferred embodiments with reference to the attached drawings.

DETAILED DESCRIPTION

A Z-axis direction appropriately illustrated in each drawing is a vertical direction in which a positive side is an "upper side" and a negative side is a "lower side". A center axis line J appropriately illustrated in each drawing is a virtual line that is parallel to the Z-axis direction and extends in the vertical direction. In the following description, an axial direction of the center axis line J, namely, the direction parallel to the vertical direction is simply referred to as an "axial direction", the upper side is referred to as a "one side in the axial direction", and the lower side is referred to as "the other side in the axial direction". Sometimes a radial direction about the center axis line J is simply referred to as a "radial direction". Furthermore, sometimes the circumferential direction centered on the center axis line J is simply referred to as the "circumferential direction", a clockwise direction when viewed from above is referred to as "one side in the circumferential direction", and a counterclockwise direction when viewed from above is referred to as "the other side in the circumferential direction".

The vertical direction, the upper side, and the lower side are merely names for describing an arrangement relationship between respective units, and an actual arrangement relationship and the like may be other than the arrangement relationship indicated by these names. Furthermore, the directions described as one side in the axial direction and the other side in the axial direction can reproduce an effect of the embodiment even when they are replaced with each other. Similarly, the directions described as one side in the circumferential direction θ1 and the other side in the circumferential direction θ2 can reproduce the effect of the embodiment even when they are replaced with each other.

Figure 1:
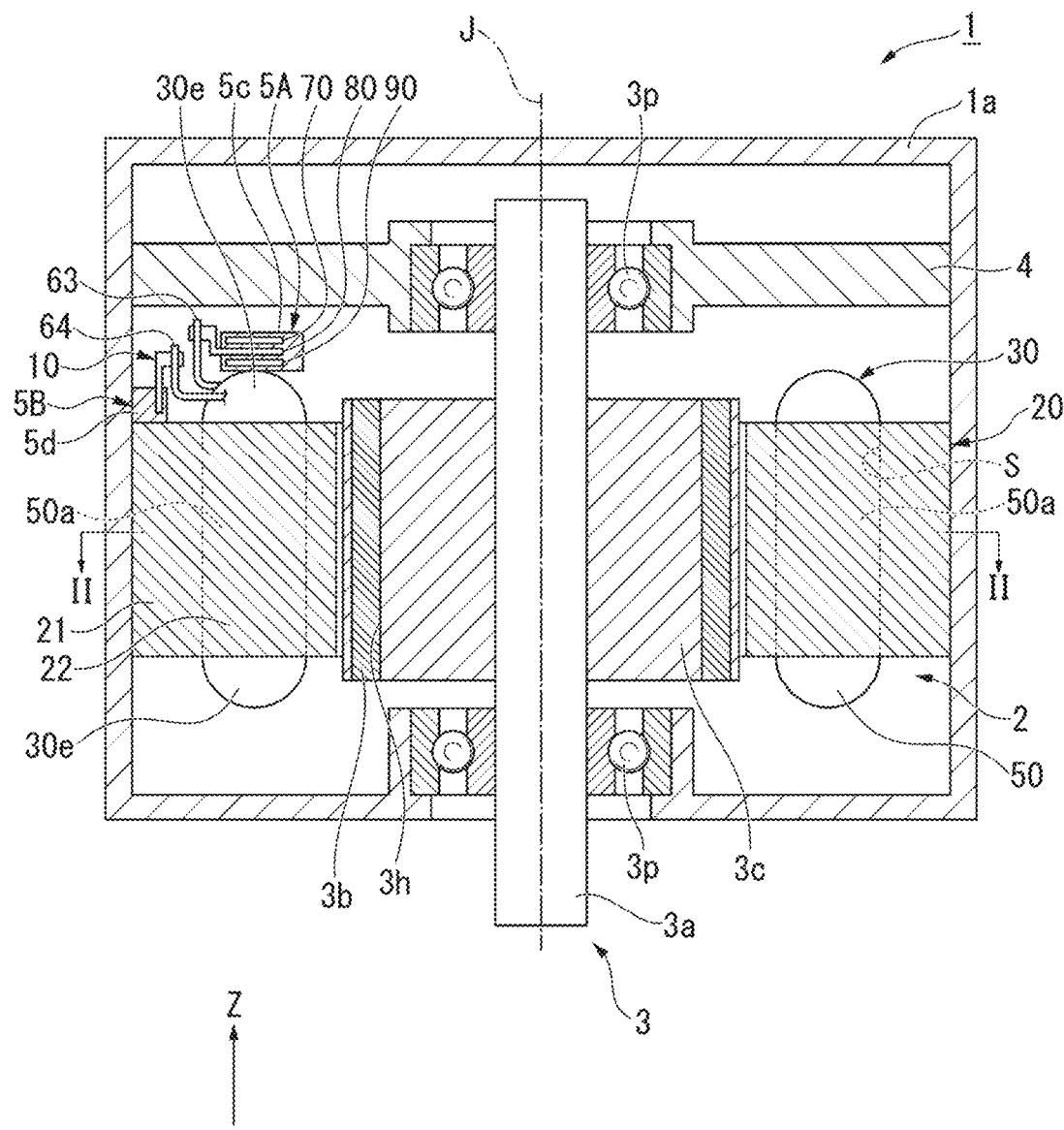
FIG. 1 is a schematic sectional view illustrating a motor according to an embodiment.

FIG. 1 is a schematic sectional view illustrating a motor 1 according to an embodiment.

The motor 1 of the embodiment is an inner-rotor motor. Furthermore, the motor 1 of the embodiment is a three-phase AC motor. The center of the motor 1 is the center axis line J.

As illustrated in FIG. 1, the motor 1 includes a rotor 3, a stator 2, a phase bus bar module (first bus bar module) 5A, a neutral bus bar module (second bus bar module) 5B, a bearing holder 4 and a housing 1a accommodating them.

The rotor 3 is rotatable about the center axis line J. The rotor 3 is arranged on the radially inside of the annular stator 2. That is, the rotor 3 is opposed to the stator 2 in the radial direction. The rotor 3 includes a shaft 3a, a rotor magnet 3b, and a rotor core 3c.

The shaft 3a extends in an axial direction along a center axis line J. The shaft 3a has a columnar shape centered on the center axis line J and extending in the axial direction. The shaft 3a is supported by two bearings 3p so as to be rotatable about the center axis line J.

Figure 2:
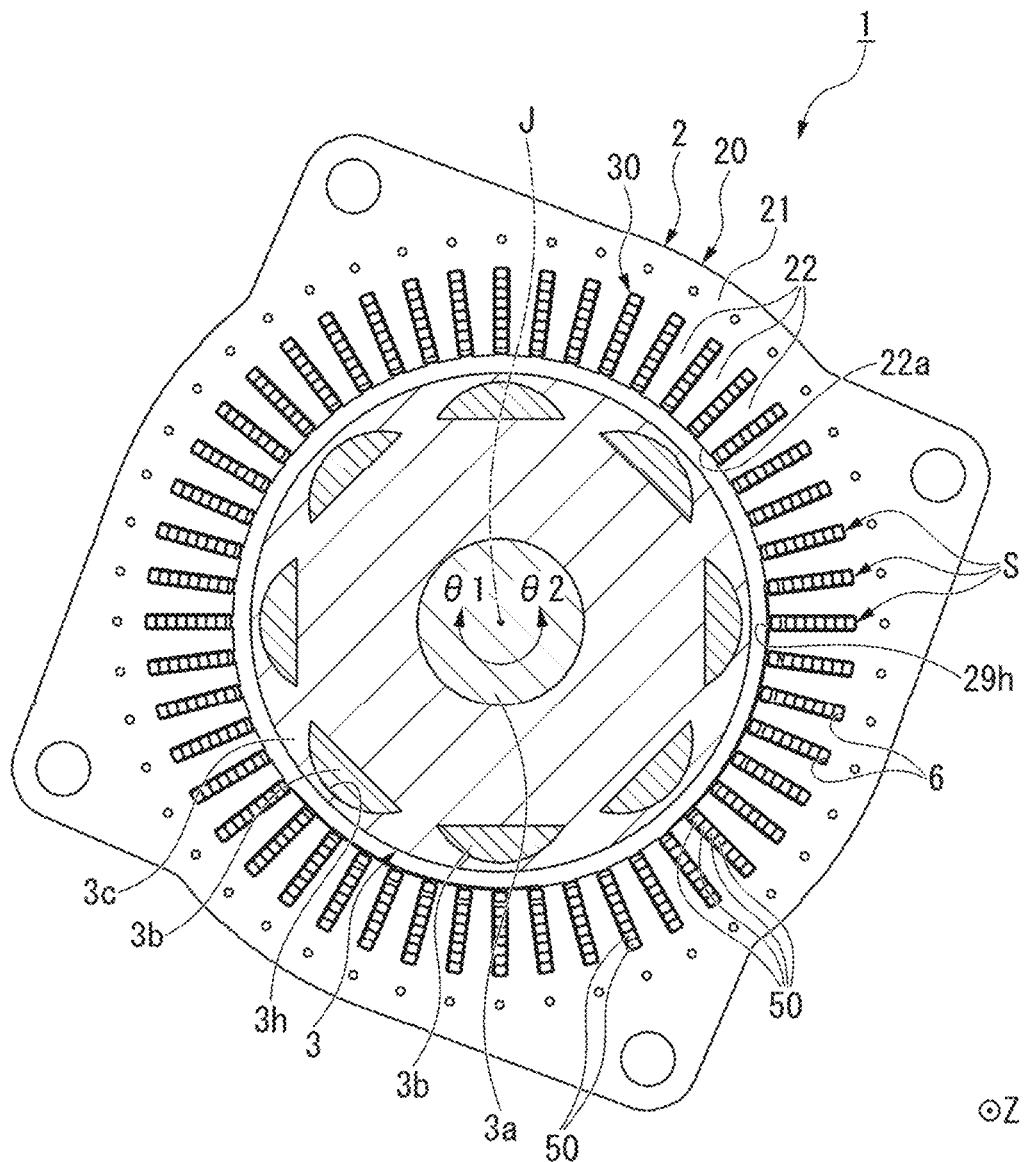
FIG. 2 is a sectional view illustrating the motor taken along a line II-II of FIG. 1.

FIG. 2 is a sectional view illustrating the motor 1 taken along a line II-II of FIG. 1.

The rotor core 3c is configured by stacking magnetic steel sheets. The rotor core 3c has a cylindrical shape extending in the axial direction. An inner peripheral surface of the rotor core 3c is fixed to an outer peripheral surface of the shaft 3a. A holding hole 3h into which the rotor magnet 3b is inserted and fixed is made in the rotor core 3c.

The rotor magnet 3b is opposed to the stator 2 in the radial direction. The rotor magnet 3b is held while embedded in the rotor core 3c. The rotor magnet 3b of the embodiment has eight poles. A number of poles of the rotor 3 is not limited to the embodiment. Furthermore, the rotor magnet 3b may be a magnet of another form such as an annular ring magnet.

The stator 2 is arranged to the rotor 3 in the radial direction with a gap interposed therebetween. In the embodiment, the stator 2 is arranged on the radially outside of the rotor 3. The stator 2 includes a stator core 20, a winding portion 30, and a plurality of insulating papers 6.

The stator core 20 has the annular shape centered on the center axis line J. The stator core 20 consists of electromagnetic steel sheets stacked along the axial direction. The stator core 20 includes a core back 21 having an annular shape centered on the center axis line J and a plurality of teeth 22 extending radially inward from the core back 21.

The plurality of teeth 22 are arranged at regular intervals in the circumferential direction. An umbrella 22a is provided at a tip portion on the inside in the radial direction of the teeth 22. The umbrella 22a projects on both sides in the circumferential direction with respect to the teeth 22. That is, a dimension in the circumferential direction of the umbrella 22a is larger than a dimension in the circumferential direction of the teeth 22. The surface of the umbrella 22a facing inward in the radial direction is opposite to the outer peripheral surface of the rotor 3 in the radial direction with a gap interposed therebetween.

The winding portion 30 is mounted on the teeth 22. A slot S is provided between the teeth 22 adjacent to each other in the circumferential direction. That is, a plurality of slots S arranged in the circumferential direction are provided in the stator core 20.

A conductor 50 of the winding portion 30 is accommodated in the slot S. The insulating paper 6 is arranged one by one in the slot S. The insulating paper 6 secures insulation between the winding portion 30 and the stator core 20 in the slot S.

Eight layers arranged in the radial direction are provided in one slot S. In one slot, one conductor 50 is placed on each layer. In the slot S, eight conductors 50 are arranged in a row along the radial direction.

The slot S includes an opening 29h that is open radially inward. The opening 29h is located between the umbrellas 22a located at the tips of the adjacent teeth 22. A width dimension along the circumferential direction of the opening 29h is smaller than the dimension along the circumferential direction of the conductor 50. For this reason, the conductor 50 is difficult to pass through the opening 29h, and the conductor 50 is prevented from being separated from the stator core 20.

In the embodiment, the stator core 20 has 48 teeth 22. That is, the stator 2 of the embodiment has 48 slots. The number of slots of the stator 2 is appropriately set according to the number of poles of the rotor magnet 3b and a method for winding the winding portion 30.

Figure 3:
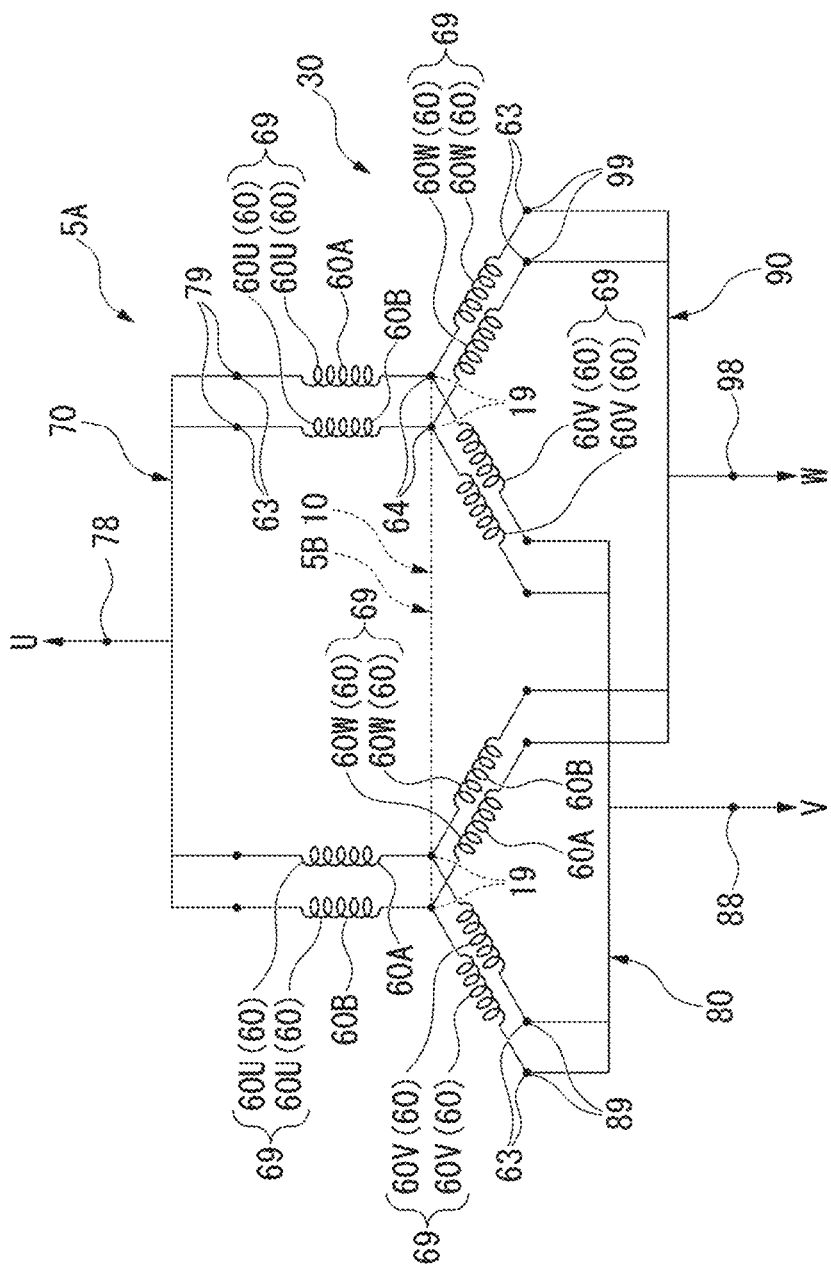
FIG. 3 is a schematic diagram illustrating a circuit configured by a winding portion and a bus bar module of the embodiment.

FIG. 3 is a schematic diagram illustrating a circuit configured by the winding portion 30, the phase bus bar module 5A, and the neutral point bus bar module 5B of the present embodiment.

The winding portion 30 of the embodiment includes a plurality of (12 in the embodiment) conductor connection bodies 60 to configure a segment coil. The 12 conductor connection bodies 60 are classified into four U-phase conductor connection bodies 60U, four V-phase conductor connection bodies 60V, and four W-phase conductor connection bodies 60W.

Furthermore, although described in detail later, the phase bus bar module 5A includes three phase bus bars (first bus bar) 70, 80, 90, and the neutral point bus bar module 5B includes one neutral point bus bar (second bus bar) 10. The three phase bus bars 70, 80, 90 are classified into a U-phase bus bar 70, a V-phase bus bar 80, and a W-phase bus bar 90.

The U-phase conductor connection body 60U, the V-phase conductor connection body 60V, and the W-phase conductor connection body 60W are Y-connected by the neutral point bus bar 10 and the phase bus bars 70, 80, 90. In the embodiment, four Y-connections corresponding to the four conductor connection bodies 60 of each phase are configured, and the Y-connections are connected in parallel. That is, the winding portion 30 is 4Y-connected by the phase bus bar module 5A and the neutral point bus bar module 5B.

In the embodiment, the case where the winding portion 30 includes four conductor connection bodies 60 having the same phase has been described. However, when the winding portion 30 includes at least two conductor connection bodies 60, and when these conductor connection bodies 60 configure a connection body pair 69 passing through the adjacent slots S in the circumferential direction, the winding configuration similar to that of the embodiment can be obtained. Accordingly, the plurality of conductor connection bodies 60 need only have Y-connections of 2×M with M as a natural number (M=2 in the embodiment).

The conductor connection body 60 includes a first end 63 and a second end 64. The first end 63 and the second end 64 are provided at one end and the other end of the conductor connection body 60, respectively. The conductor connection body 60 is mounted on the stator core 20 between the first end 63 and the second end 64 to configure a coil of each phase. The conductor connection body 60 is connected to the phase bus bar module 5A and the neutral point bus bar module 5B at the first end 63 and the second end 64.

The second ends 64 of the four U-phase conductor connection bodies 60U, the four V-phase conductor connection bodies 60V, and the four W-phase conductor connection bodies 60W are connected to one neutral point bus bar 10. Thus, the second end 64 of the 12 conductor connection bodies 60 becomes the same potential and configures a neutral point. That is, the neutral point bus bar 10 configures the neutral point of the three-phase circuit.

The first ends 63 of the four U-phase conductor connection bodies 60U are connected to the U-phase bus bar 70. The first ends 63 of the four V-phase conductor connection bodies 60V are connected to the V-phase bus bar 80. The first ends 63 of the four W-phase conductor connection bodies 60W are connected to the W-phase bus bar 90. Alternating currents in which the phase is deviated for each 120° are passed through the phase bus bars 70, 80, 90.

Two of the four conductor connection bodies 60 having the same phase pass through the adjacent slots S and are mounted on the stator core 20. In the present specification, two conductor connection bodies 60 passing through the adjacent slots S are referred to as the connection body pair 69. Furthermore, in the following description, when two conductor connection bodies 60 forming the connection body pair 69 are distinguished from each other, one is referred to as a first conductor connection body 60A and the other is referred to as a second conductor connection body 60B.

Figure 4:
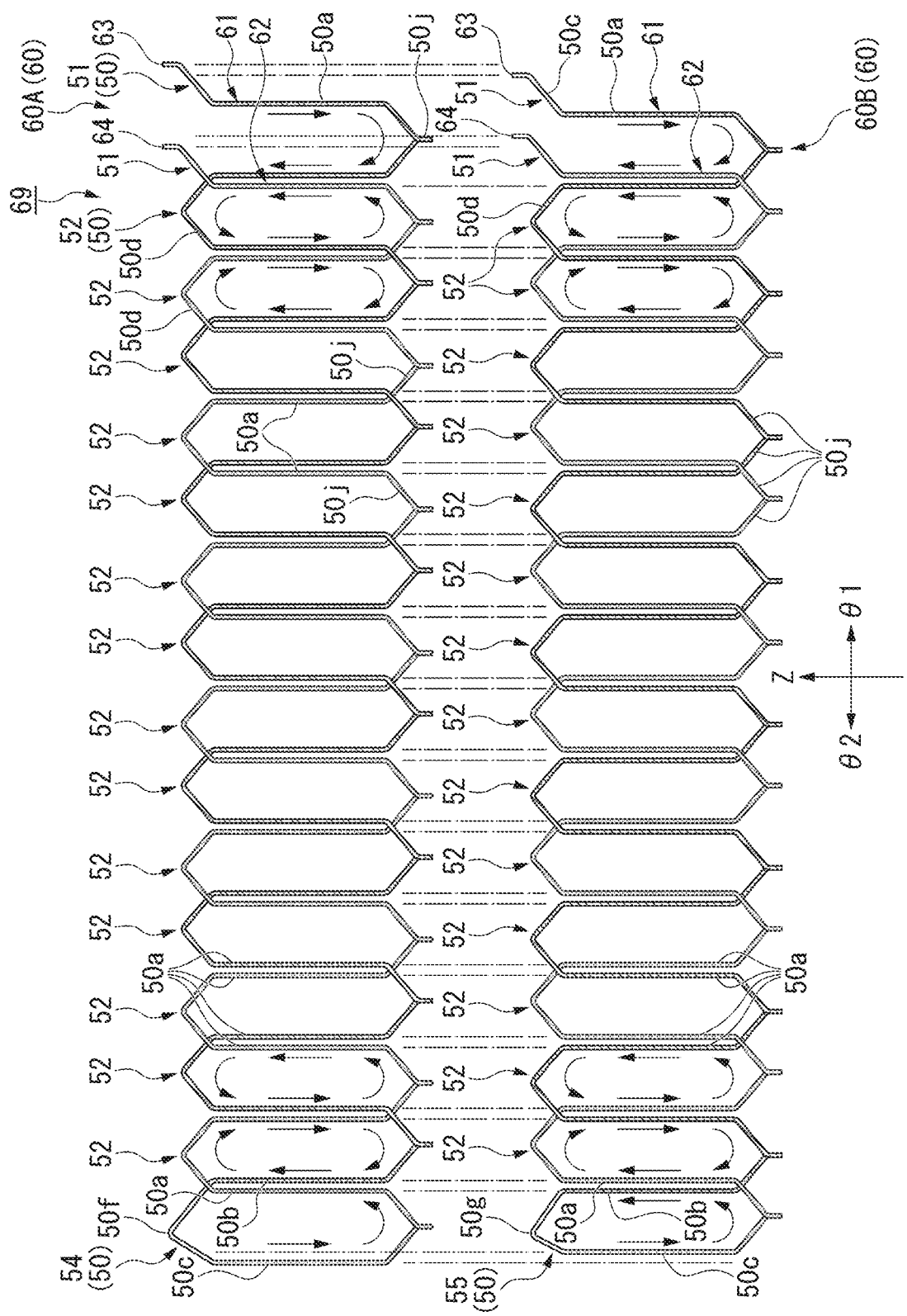
FIG. 4 is a schematic diagram illustrating a winding configuration of a conductor connection body of the embodiment.

FIG. 4 is a schematic diagram illustrating a winding configuration of two conductor connection bodies 60 forming the connection body pair 69.

As illustrated in FIG. 4, the conductor connection body 60 is configured by connecting the plurality of conductors 50 in series. Each conductor 50 is configured by bending a flat wire. Accordingly, a space factor of the conductor 50 in the slot S can be improved as compared with the case of using a round wire. In the present specification, the "flat wire" is a wire rod having a quadrangular sectional shape or a substantially quadrangular sectional shape. In the present specification, the term "substantially square shape" includes a square shape with rounded corners. Although not illustrated, the conductor 50 in the embodiment has an enamel coating on the surface.

The plurality of conductors 50 configuring the conductor connection body 60 are classified into an end conductor 51, a hairpin conductor 52, a first folded conductor 54, and a second folded conductor 55.

Each of the various conductors 50 includes at least straight portions 50a, 50b, 50c extending linearly along the axial direction (Z-direction) and a connection portion 50j located at an end portion of the lower side (the other side in the axial direction). The straight portions 50a, 50b, 50c pass through the slot S. That is, the conductor connection body 60 is accommodated in the slot S at the straight portions 50a, 50b, 50c. The conductor connection body 60 extends above and below the stator core 20 in regions other than the straight portions 50a, 50b, 50c. The portions extending from the upper side and the lower side of the stator core 20 configure a coil end 30e (see FIG. 1) of the stator core 20.

The straight portion 50a is classified into a first straight portion 50a, a second straight portion 50b, and a third straight portion 50c. The first straight portion 50a is a straight portion connected to a crossing portion 50d or the ends 63, 64. The second straight portion 50b and the third straight portion 50c are straight portions connected to one end or the other end of the folded portions 50f, 50g.

A connection portion 50j is connected to a connection portion 50j of another conductor 50. The connection portions 50j of the pair of conductors 50 are joined to each other by joining means such as welding. The connection portion 50j is bent in the circumferential direction after the conductor 50 is mounted on the stator core 20, and the connection portion 50j is welded to the connection portion 50j of another conductor 50. In the conductor 50 before mounting on the stator core 20, the connection portion 50j has a straight line continuous to the straight portions 50a, 50b, 50c. The conductor 50 is attached to the stator core 20 by inserting the connection portion 50j and the straight portions 50a, 50b, 50c into the slot S from the upper side (one side in the axial direction) of the stator core 20. The connection portion 50j is bent in the circumferential direction and welded to another connection portion 50j, so that the conductor 50 is prevented from being axially detached from the stator core 20.

The plurality of conductors 50 are inserted into the slot S of the stator core 20 from the upper side and joined on the lower side, so that the stator 2 of the embodiment can be assembled. Consequently, a complicated assembly process is not required, but an assembly process can be simplified.

Various conductors 50 will be described below.

The end conductor 51 includes each one of the ends 63, 64, one straight portion 50a, and one connection portion 50j. The ends 63, 64 are located at the upper end portion of the end conductor 51. The ends 63, 64 are bent in the circumferential direction with respect to the straight portion 50a. In the end conductor 51, the ends 63, 64 and the connection portion 50j extend in the direction opposite to the circumferential direction with respect to the straight portion 50a. In the end conductor 51, the ends 63, 64 extend from the upper end of the straight portion 50a to one side in the circumferential direction θ1, and the connection portion 50j extends from the lower end of the straight portion 50a to the other side in the circumferential direction θ2.

One of the neutral point bus bar 10, the U-phase bus bar 70, the V-phase bus bar 80, and the W-phase bus bar 90 is connected to the ends 63, 64. The two ends 63, 64 are provided at both end portions of the conductor connection body 60, respectively. In the two ends 63, 64, one is the first end 63 and the other is the second end 64.

The hairpin conductor 52 includes two straight portions 50a, two connection portions 50j, and one crossing portion 50d. The crossing portion 50d is arranged at the upper end portion of the hairpin conductor 52. The crossing portion 50d passes two straight portions 50a to each other. That is, in the hairpin conductor 52, two straight portions 50a are connected to each other through the crossing portion 50d. In the hairpin conductor 52, two connection portions 50j are connected to the lower ends of different straight portions 50a. The plurality of crossing portions 50d project from the upper end surface (one side in the axial direction) of the stator core 20.

In the hairpin conductor 52, two straight portions 50a are lined up with the number of slots per pole s. At this point, the number of slots per pole s means the number of slots S of the stator 2 arranged between magnetic poles of the rotor 3 in the combination of the rotor 3 and the stator 2. The number of slots per pole s is calculated by (the total number of slots in the stator 2)/(the number of magnetic poles in the rotor 3). In the embodiment, the number of magnetic poles of the rotor 3 is 8, and the number of slots of the stator 2 is 48, so that the number of slots per pole s is 6. In the hairpin conductor 52, the two straight portions 50a are separated from each other by six slots in the circumferential direction.

In the hairpin conductor 52, two connection portions 50j are bent in opposite directions in the circumferential direction. In two connection portions 50j, one located on one side θ1 in the circumferential direction extends from the lower end of the straight portion 50a to the other side θ2 in the circumferential direction, and the other located on the other side θ2 in the circumferential direction extends from the lower end of the straight portion 50a to one side θ1 in the circumferential direction. Each 12 hairpin conductors 52 are provided in the first conductor connection body 60A and the second conductor connection body 60B.

The first folded conductor 54 includes two straight portions 50b, 50c, two connection portions 50j, and one first folded portion (folded portion) 50f. The second folded conductor 55 includes two straight portions 50b, 50c, two connection portions 50j, and one second folded portion (folded portion) 50g. The first folded portion 50f and the second folded portion 50g are arranged at the upper end portion of the first folded conductor 54 or the second folded conductor 55.

The first folded portion 50f and the second folded portion 50g pass two straight portions 50b, 50c to each other. That is, in the first folded conductor 54 and the second folded conductor 55, the two straight portions 50b, 50c are connected to each other through the first folded portion 50f or the second folded portion 50g.

In the first folded conductor 54 and the second folded conductor 55, two connection portions 50j are bent in one side θ1 in the circumferential direction. That is, in the first folded conductor 54 and the second folded conductor 55, two connection portions 50j extend from the lower ends of the straight portions 50b, 50c to one side θ1 in the circumferential direction.

The first folded conductor 54 and the second folded conductor 55 have two straight portions 50b, 50c, respectively. In two straight portions 50b, 50c, one located on one side θ1 in the circumferential direction is the second straight portion 50b, and one located on the other side θ2 in the circumferential direction is the third straight portion 50c.

In the first folded conductor 54 and the second folded conductor 55, the distances between two straight portions 50b, 50c are different from each other. In the first folded conductor 54, the second straight portion 50b and the third straight portion 50c are arranged in the circumferential direction with the number of slots per pole s+1 (7 slots in the embodiment). On the other hand, in the second folded conductor 55, the second straight portion 50b and the third straight portion 50c are arranged in the circumferential direction with the number of slots per pole s−1 (5 slots in this embodiment). For this reason, the first folded portion 50f has a larger crossing amount in the circumferential direction by two slots than the second folded portion 50g. One first folded conductor 54 is provided in the first conductor connection body 60A. On the other hand, one second folded conductor 55 is provided in the second conductor connection body 60B.

Winding configurations of the first conductor connection body 60A and the second conductor connection body 60B will be described below.

In the first conductor connection body 60A, two end conductors 51 are arranged at both ends of the first conductor connection body 60A, and the first folded conductor 54 is arranged substantially in the middle. The first conductor connection body 60A is wave-wound every six slots toward the other side θ2 in the circumferential direction from the first end 63 to the first folded portion 50f. Furthermore, the first conductor connection body 60A is wave-wound every six slots toward one side θ1 in the circumferential direction from the first folded portion 50f to the second end 64.

At this point, in the first conductor connection body 60A, the region that is wave-wound on the other side θ2 in the circumferential direction between the first end 63 and the first folded portion 50f is referred to as a first portion 61. In the first conductor connection body 60A, the region that is wave-wound on one side θ1 in the circumferential direction between the first folded portion 50f and the second end 64 is referred to as a second portion 62. That is, the first conductor connection body 60A includes the first end 63, the first portion 61 wave-wound from the first end 63 to the other side θ2 in the circumferential direction, the first folded portion 50f connected to the end portion on the other end 02 in the circumferential direction of the first portion 61, the second portion 62 wave-wound from the first folded portion 50f to one side θ1 in the circumferential direction, and the second end 64 connected to the end portion of one side θ1 in the circumferential direction of the second portion 62.

In the second conductor connection body 60B, two end conductors 51 are arranged at the ends of both ends of the second conductor connection body 60B. The second conductor connection body 60B in which the second folded conductor 55 is arranged substantially in the middle is wave-wound every six slots toward the other side θ2 in the circumferential direction from the first end 63 to the second folded portion 50g (first portion 61). Furthermore, the second conductor connection body 60B is wave-wound every six slots toward one side θ1 in the circumferential direction between (second portion 62) the second folded portion 50g and the second end 64 that is the second end 64. That is, the second conductor connection body 60B includes the first end 63, the first portion 61 wave-wound from the first end 63 to the other side θ2 in the circumferential direction, the second folded portion 50g connected to the end portion of the other side θ2 in the circumferential direction of the first portion 61, the second portion 62 wave-wound from the second folded portion 50g to one side θ1 in the circumferential direction, and the second end 64 connected to the end portion of one side θ1 in the circumferential direction of the second portion 62.

The conductor connection body 60 of the embodiment is wave-wound with the number of slots per pole s in the first portion 61 and the second portion 62. That is, the conductor connection body 60 is mounted on the stator core 20 by full pitch winding. For this reason, according to the embodiment, the plurality of conductors 50 arranged in the same slot S are all a part of the conductor connection body 60 having the same phase. Consequently, according to the embodiment, the conductor connection bodies 60 having different phases is not required to be insulated in one slot S, but the insulation is easy to secure.

In the embodiment, the winding portion 30 has the first end 63, the second end 64, the crossing portion 50d, and the folded portion 50f, 50g. The first end 63, the second end 64, the crossing portion 50d, and the folded portions 50f, 50g configure the coil end 30e on the upper side of the stator core 20. On the other hand, the connection portion 50j configures the coil end 30e on the lower side of the stator core 20. The first end 63 and the second end 64 are arranged on the outermost circumference of the coil end 30e. That is, the first end 63 and the second end 64 are located on the radial outside of the plurality of crossing portions 50d. The first end 63 extends upward (one side in the axial direction) from the stator core 20 and is connected to the phase bus bars 70, 80, 90. Similarly, the second end 64 extends upward (one side in the axial direction) from the stator core 20 and is connected to the neutral point bus bar 10.

According to the embodiment, the folded portions 50f, 50g are arranged on the innermost circumference of the coil end 30e. That is, the folded portions 50f, 50g are arranged on the radially inside of the plurality of crossing portions 50d. For this reason, the area radially inside the coil end 30e can be used as the arrangement area of the folded portions 50f, 50g, and the dimension in the vertical direction of the coil end 30e can be reduced.

Furthermore, according to the embodiment, the folded portions 50f, 50g are located on the innermost circumference of the coil end 30e, so that two ends 63, 64 can be located in the outermost circumference of the coil end 30e. That is, according to the embodiment, the first end 63 and the second end 64 extend from the outermost layer. Accordingly, a connection step between the neutral point bus bar 10 and the first end 63 and a connection step between the phase bus bars 70, 80, 90 and the second end 64 can be performed from the radial direction with respect to the coil end 30e, and a manufacturing process of the motor 1 can be simplified.

As illustrated in FIG. 4, the first conductor connection body 60A and the second conductor connection body 60B have opposite orders in the circumferential direction of the passing slots S at the folded portions 50*f*, 50*g*. The first end 63 of the first conductor connection body 60A is located on one side in the circumferential direction of the first end 63 of the second conductor connection body 60B. Furthermore, the second end 64 of the first conductor connection body 60A is located on the other side in the circumferential direction of the second end 64 of the second conductor connection body 60B. The U-phase connection body pair 69, the V-phase connection body pair 69, and the W-phase connection body pair 69 are arranged side by side in this order toward the other side θ2 in the circumferential direction.

As illustrated in FIG. 1, the phase bus bar module 5A and the neutral point bus bar module 5B are disposed above the stator 2. More specifically, the phase bus bar module 5A is disposed directly above the coil end 30*e*. The neutral point bus bar module 5B is disposed on the upper side of the core back 21 and on the radial outside of the coil end 30*e*. Accordingly, the phase bus bar module 5A is opposite to the coil end 30*e* in the axial direction, and the neutral point bus bar module 5B is opposite to the coil end 30*e* in the radial direction.

In this specification, "directly above" means that at least a part is overlapped when viewed from the upper side and the vertical direction. Accordingly, the phase bus bar module 5A is disposed above the coil end 30*e* and overlapped with the coil end 30*e* when viewed from the vertical direction.

Figure 5:
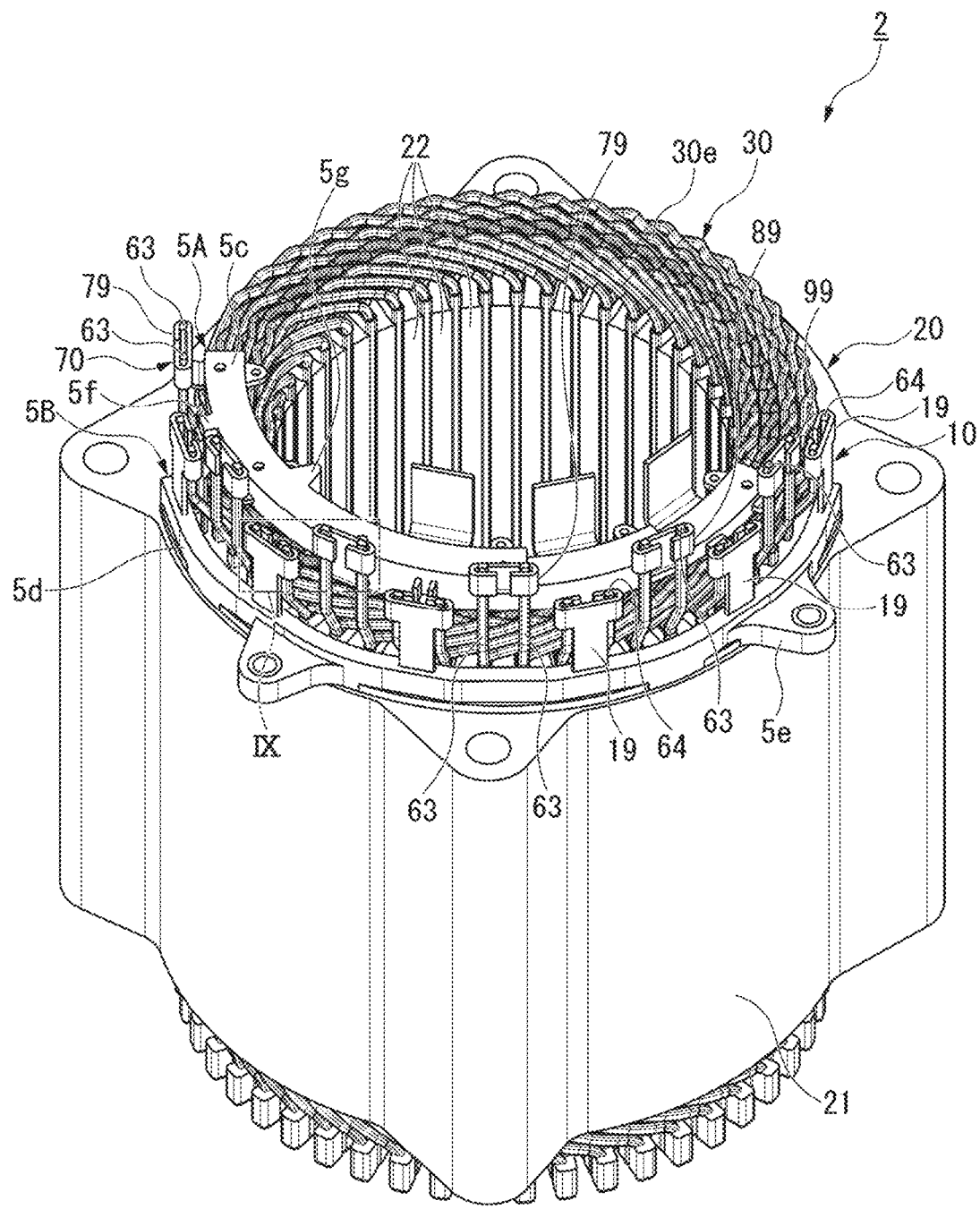
FIG. 5 is a perspective view illustrating a stator, a phase bus bar module, and a neutral point bus bar module of the embodiment.
Figure 6:
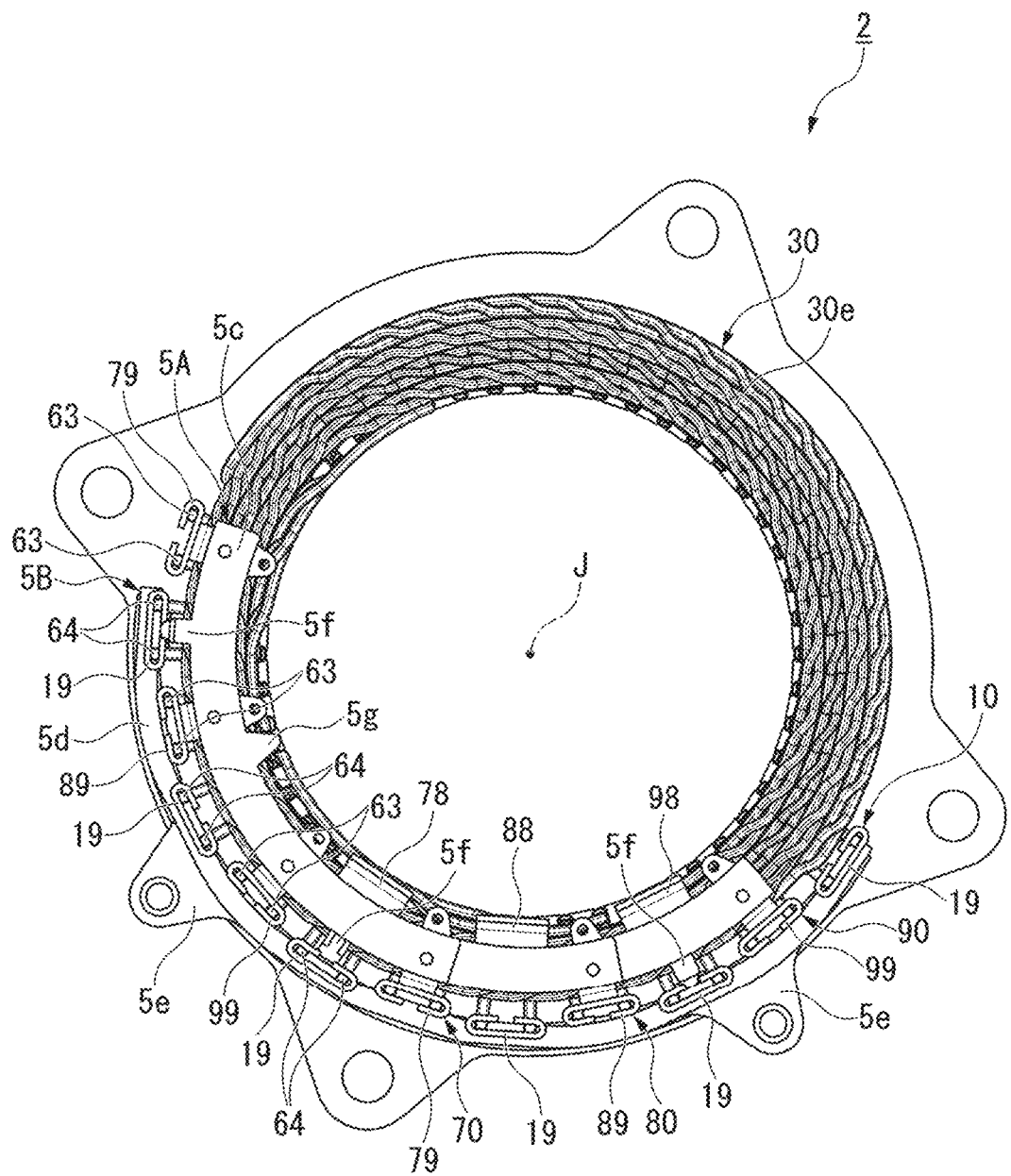
FIG. 6 is a plan view illustrating the stator, the phase bus bar module, and the neutral point bus bar module of the embodiment.
Figure 7:
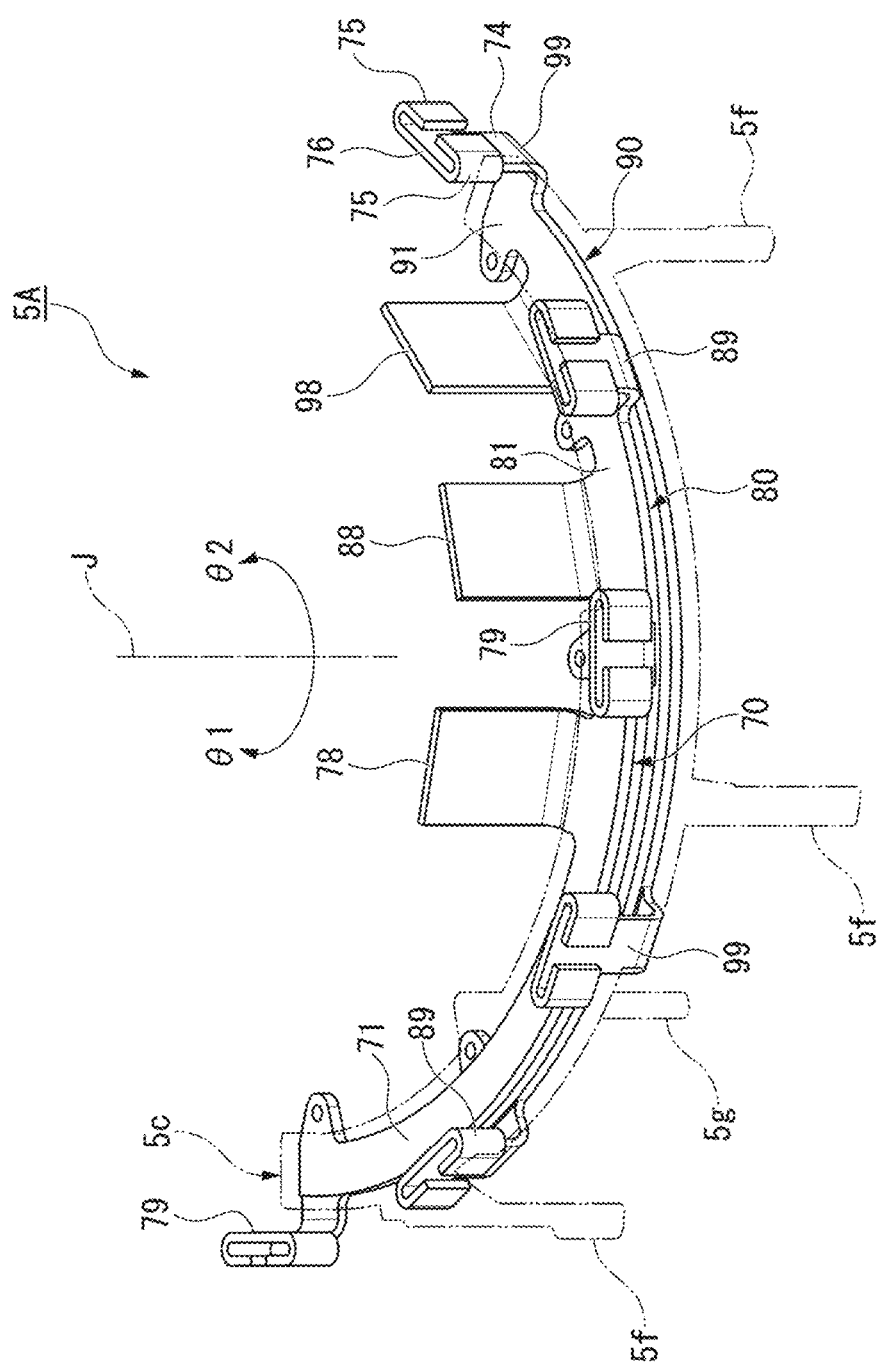
FIG. 7 is a perspective view illustrating the phase bus bar module of the embodiment.
Figure 8:
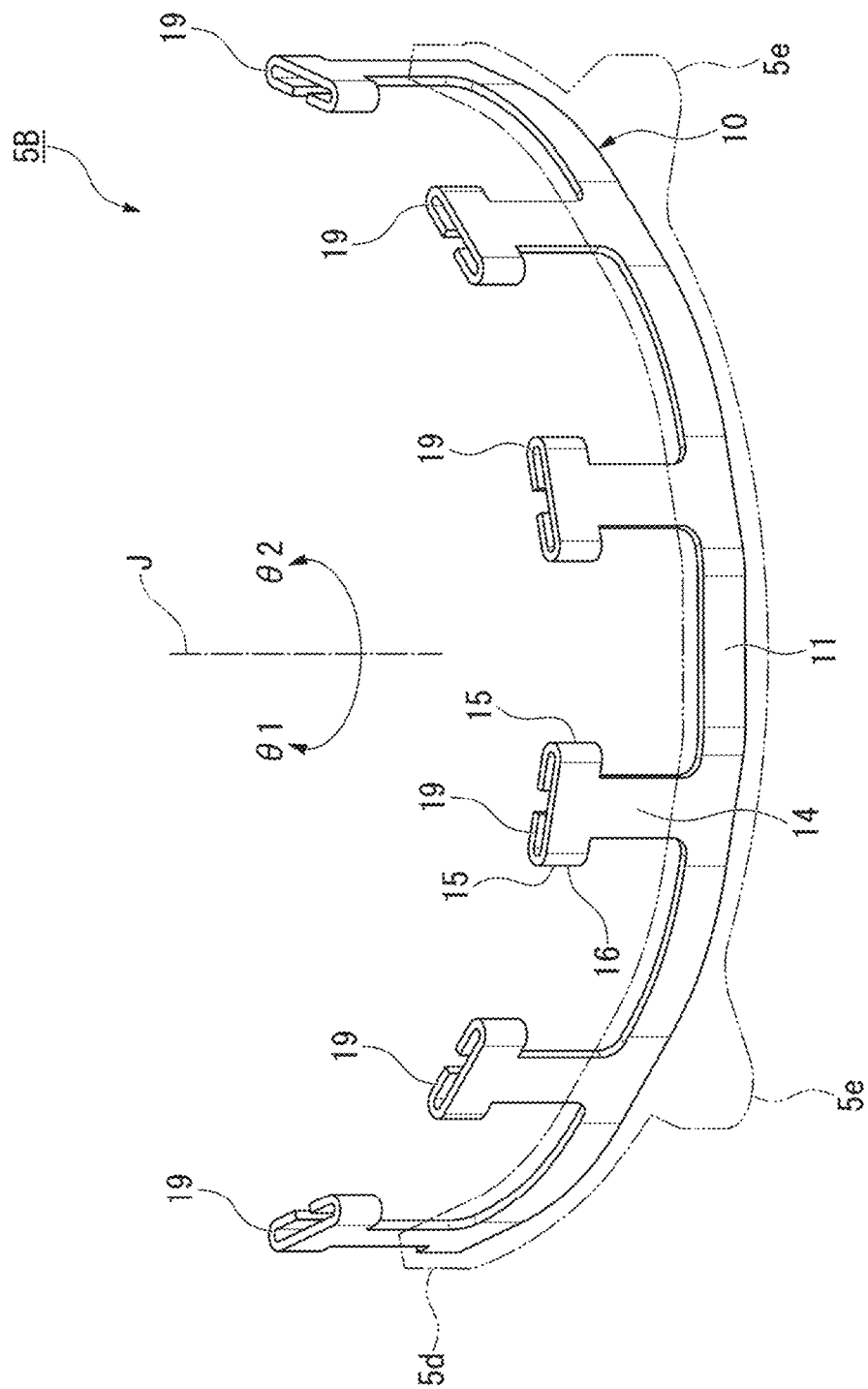
FIG. 8 is a perspective view illustrating the neutral point bus bar module of the embodiment.

FIG. 5 is a perspective view illustrating the stator 2, the phase bus bar module 5A, and the neutral point bus bar module 5B of the embodiment. FIG. 6 is a plan view illustrating the stator 2, the phase bus bar module 5A, and the neutral point bus bar module 5B of the embodiment. FIG. 7 is a perspective view illustrating the phase bus bar module 5A. FIG. 8 is a perspective view illustrating the neutral point bus bar module 5B. In FIGS. 7 and 8, the illustration of a first holding member 5*c* and a second holding member 5*d* are omitted.

As illustrated in FIG. 6, the phase bus bar module 5A and the neutral point bus bar module 5B extend along the circumferential direction. The circumferential position of the phase bus bar module 5A and the circumferential position of the neutral point bus bar module 5B overlap each other.

As illustrated in FIG. 7, the phase bus bar module 5A includes the phase bus bars 70, 80, 90 and the first holding member 5*c*. That is, the motor 1 includes the phase bus bars 70, 80, 90 and the first holding member 5*c*. The phase bus bars 70, 80, 90 have a plate shape formed by press working.

The phase bus bars 70, 80, 90 include first main body portions 71, 81, 91, input terminal portions 78, 88, 98, and a plurality of first terminal portions 79, 89, 99. The first main body portions 71, 81, 91 of the respective phase bus bars 70, 80, 90 have the same shape. Furthermore, the plurality of input terminal portions 78, 88, 98 of the respective phase bus bars 70, 80, 90 have the same shape. On the other hand, the shapes of the plurality of first terminal portions 79, 89, 99 of the respective phase bus bars 70, 80, 90 are different from each other.

The first main body portions 71, 81, 91 extend in an arcuate shape along the circumferential direction. The first main body portions 71, 81, 91 have a plate shaped with the axial direction as the plate thickness direction. The phase bus bars 70, 80, 90 are laminated in the axial direction in the first main body portions 71, 81, 91. In the three first main body portions 71, 81, 91, the U-phase bus bar 70, the V-phase bus bar 80, and the W-phase bus bar 90 are arranged from the upper side to the lower side in this order. Each of the three first main body portions 71, 81, 91 extends in an arcuate shape along the circumferential direction. The three first main body portions 71, 81, 91 are disposed so as to be offset in the circumferential direction. Accordingly, in the phase bus bar module 5A, three types of areas of an area where the three first main body portions 71, 81, 91 are laminated, an area where two are laminated, and an area where only one is laminated are provided side by side in the circumferential direction.

Each of the phase bus bars 70, 80, 90 includes two first terminal portions 79, 89, 99. The two first terminal portions 79, 89, 99 are disposed at both ends in the circumferential direction of the respective phase bus bars 70, 80, 90.

Each two first ends 63 are connected to one first terminal portion 79, 89, 99. Accordingly, four first ends 63 are connected to one phase bus bar 70, 80, 90.

The first terminal portions 79, 89, 99 extend radially outward and upward from the outer edges of the first main body portions 71, 81, 91. The positions of the upper ends of the first terminal portions 79, 89, 99 of the three phase bus bars 70, 80, 90 are matched with each other. As described above, the positions of the first main body portions 71, 81, 91 of the three phase bus bars 70, 80, 90 are different from each other in the vertical direction. For this reason, vertical protrusion dimensions of the first terminal portions 79 of the phase bus bars 70, 80, 90 are different from each other. That is, the vertical protrusion dimensions of the first terminal portion 79 of the U-phase bus bar 70, the V-phase bus bar 80, and the W-phase bus bar 90 increase in this order.

Figure 9:
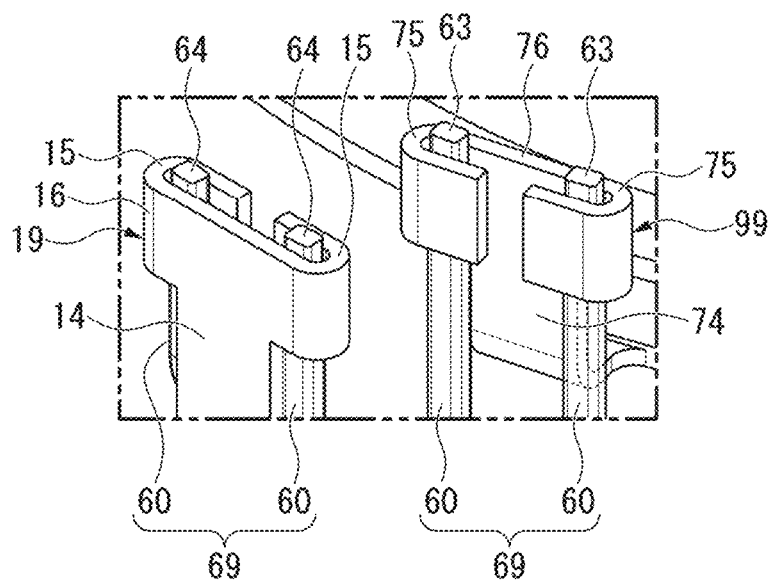
FIG. 9 is an enlarged view of a region IX in FIG. 5.

FIG. 9 is an enlarged view of a region IX in FIG. 5.

A configuration of a first terminal portion 99 will be described with reference to FIG. 9. Although not illustrated, the first terminal portions 79, 89 of other phase bus bars 70, 80 have the same configuration as the first terminal portion 99 in FIG. 9.

The first terminal portion 99 includes an extension portion 74 extending from the first main body portion 91 and a terminal main body 76 located at the upper end portion of the extension portion 74. The terminal main body 76 is a belt-shaped plate portion extending in the circumferential direction with the axial direction (vertical direction) as a plate width direction. Both ends in the circumferential direction of the terminal main body 76 are bent radially outward in a U-shape. The bent portions at both ends in the circumferential direction of the terminal main body 76 configure a first grip 75. That is, the first terminal portion 99 includes two U-shaped first grips 75 that are open while facing each other.

The first grip 75 sandwiches the first end 63 in the opening from both sides in the radial direction. The first grip 75 and the first end 63 are welded to each other. As a result, the first end 63 is electrically connected to the phase bus bars 70, 80, 90.

In the embodiment, two first ends 63 are connected to each first terminal portion 99. The two conductor connection bodies 60 connected to the first terminal portion 99 of the W-phase bus bar 90 in FIG. 9 are the first ends 63 of the two W-phase conductor connection body 60 pass through the slots S adjacent to each other in the circumferential direction and are mounted on the stator core 20. The same applies to the U-phase and the V-phase, and the first terminal portions 79, 89, 99 are connected to two in-phase first terminal portions extending from the slots S adjacent to each other in the circumferential direction.

According to the embodiment, the first terminal portion 99 is connected to the first end 63 at each of two first grips 75 that are open while opposite to each other in the circumferential direction. For this reason, the two first grips 75 can be simultaneously sandwiched from both sides in the radial direction by the electrodes for resistance welding. The first grip 75 and the first end 63 can be simultaneously welded at two locations by resistance welding, and the connection process can be simplified.

As illustrated in FIG. 5, according to the embodiment, two in-phase first ends 63 can be connected to one first terminal portion 79, 89, 99. For this reason, in the phase bus bars 70, 80, 90, the number of the first terminal portions 79, 89, 99 can be reduced, and the shape of the phase bus bars 70, 80, 90 can be simplified. Furthermore, by disposing the two first ends 63 close to each other, the phase bus bars 70, 80, 90 can be miniaturized in the circumferential direction as a whole.

As illustrated in FIG. 7, the input terminal portions 78, 88, 98 of the phase bus bars 70, 80, 90 extend upward from inner edges of the first main body portions 71, 81, 91. Furthermore, the input terminal portions 78, 88, 98 are connected to an inverter (not illustrated) through another bus bar (not illustrated) prepared separately. In each of the phase bus bars 70, 80, 90, the input terminal portions 78, 88, 98 are disposed between the two first terminal portions 79, 89, 99 in the circumferential direction.

The first holding member 5c is made of an insulating resin member. The first holding member 5c is molded by insert molding in which a part of the phase bus bars 70, 80, 90 is embedded. Thus, the first holding member 5c holds the three phase bus bars 70, 80, 90.

In the first holding member 5c, the first main body portions 71, 81, 91 of the phase bus bars 70, 80, 90 are embedded, and the first terminal portions 79, 89, 99 and the input terminal portions 78, 88, 98 are exposed. The resin member of the first holding member 5c is inserted between the first main body portions 71, 81, 91 of the phase bus bars 70, 80, 90. That is, an insulating resin member is interposed between the first main body portions 71, 81, 91 laminated in the axial direction. As a result, even when the first main body portions 71, 81, 91 are disposed close to each other, the insulation between the first main body portions 71, 81, 91 can be ensured.

The first holding member 5c includes three first legs (legs) 5f and one second leg (leg) 5g that extend downward (the other side in the axial direction) from the portion where the first main body portions 71, 81, 91 are embedded. The first leg 5f is located radially outward with respect to the first main body portions 71, 81, 91. The lower end of the first leg 5f comes into contact with the upper surface of the core back 21 (the surface facing one side in the axial direction). The second leg 5g is located radially inward with respect to the first main body portions 71, 81, 91. The lower end of the second leg 5g is located on the upper surface of the teeth 22. Thus, the phase bus bar module 5A is mounted on the stator core 20.

As illustrated in FIG. 8, the neutral point bus bar module 5B includes the neutral point bus bar 10 and the second holding member 5d. That is, the motor 1 includes the neutral point bus bar 10 and the second holding member 5d. The neutral point bus bar 10 has a plate shape formed by press working. The neutral point bus bar 10 includes a second main body portion 11 and a plurality of second terminal portions 19. The second main body portion 11 extends in an arcuate shape along the circumferential direction. The second main body portion 11 has a plate shape with the radial direction as the plate thickness direction.

Six second terminal portions 19 are provided in the neutral point bus bar 10. Two second ends 64 are connected to one second terminal portion 19. Accordingly, 12 second ends 64 are connected to the neutral point bus bar 10. The six second terminal portions 19 are arranged at equal intervals along the circumferential direction of the respective phase bus bars 70, 80, 90. The second terminal portion 19 extends upward from an upper end edge of the second main body portion 11. The positions of the upper ends of the second terminal portion 19 of the six neutral point bus bars 10 are matched with each other.

As illustrated in FIG. 9, the second terminal portion 19 has the same shape as the first terminal portion 99. The second terminal portion 19 includes an extension portion 14 extending from the second main body portion 11 and a terminal main body 16 located at the upper end of the extension portion 14. The terminal main body 16 has the belt-shaped plate portion extending in the circumferential direction with the axial direction (vertical direction) as the plate width direction. In the terminal main body 16, both ends in the circumferential direction are bent radially inward in a U-shape. The bending direction of the terminal main body 16 of the second terminal portion 19 and the bending direction of the first terminal portion 99 are opposite in the radial direction. The bent portions at both ends in the circumferential direction of the terminal main body 16 configure the second grip 15. That is, the second terminal portion 19 includes two U-shaped second grips 15 that are open while facing each other.

The second grip 15 sandwiches the second end 64 in the opening from both sides in the radial direction. The second grip 15 and the second end 64 are welded to each other. Thus, the second end 64 is electrically connected to the neutral point bus bar 10. Similar to the first terminal portion 79, the second terminal portion 19 can simultaneously sandwich the two second grips 15 from both sides in the radial direction by the electrodes for resistance welding, so that the second grip 15 and the second end 64 can be simultaneously welded at two locations, and the connection process can be simplified.

In the embodiment, two second ends 64 are connected to one second terminal portion 19. The two conductor connection bodies 60 connected to the second terminal portion 19 are the second end 64 of the two in-phase conductor connection bodies 60 (connection body pair 69 in FIG. 4) that pass through the slots S adjacent to each other in the circumferential direction and are mounted on the stator core 20. That is, according to the embodiment, two in-phase second ends 64 can be connected to one second terminal portion 19. Therefore, in the neutral point bus bar 10, the number of the second terminal portions 19 can be decreased, and the shape of the neutral point bus bar 10 can be simplified. Furthermore, by arranging the two second ends 64 close to each other, the neutral point bus bar 10 can be miniaturized in the circumferential direction as a whole.

As illustrated in FIG. 6, each of the first terminal portions 79, 89, 99 of the phase bus bars 70, 80, 90 is connected to the first end 63 from the radial inside. Furthermore, the second terminal portion 19 of the neutral point bus bar 10 is connected to the second end 64 from the radial outside. That is, the first terminal portions 79, 89, 99 and the second terminal portion 19 are connected from the opposite side in the radial direction with respect to the ends 63, 64. According to the embodiment, the first terminal portions 79, 89, 99 and the second terminal portion 19 can be prevented from coming too close to each other, and the insulation between the first terminal portions 79, 89, 99 and the second terminal portion 19 is easy to secure. In addition, the connection positions between the first terminal portions 79, 89, 99 and the first end 63 and the connection positions between the second terminal portion 19 and the second end 64 are easily disposed on the same circumference centered on the center axis line J, and the connection process can be simplified.

According to the embodiment, the first terminal portions 79, 89, 99 and the second terminal portion 19 are alternately arranged in the circumferential direction. For this reason, the first terminal portions 79, 89, 99 are easily disposed so as to be sufficiently separated from each other in the circumferential direction, and the insulation between the first terminal portions 79, 89, 99 is easy to secure.

As illustrated in FIG. 5, according to the embodiment, the first end 63 and the second end 64 extend upward and are connected to the first terminal portions 79, 89, 99 or the second terminal portion 19 at the upper end. In addition, the connection position between the first end 63 and the first terminal portions 79, 89, 99 is located above the connection position between the second end 64 and the second terminal portion 19. For this reason, even when the first terminal portions 79, 89, 99 and the second terminal portion 19 are disposed close to each other in the circumferential direction, the first terminal portions 79, 89, 99 and the second terminal portion 19 are separated in the axial direction, so that a straight distance between the first terminal portions 79, 89, 99 and the second terminal portion 19 can be secured. Thus, it is possible to secure the insulation between the first terminal portion 79, 89, 99 and the second terminal portion 19.

The second holding member 5d is made of an insulating resin member. The second holding member 5d is molded by insert molding in which a part of the neutral point bus bar 10 is embedded. Thus, the second holding member 5d holds the neutral point bus bar 10. The second holding member 5d comes into contact with the upper surface (the surface facing one side in the axial direction) of the core back 21. That is, the neutral point bus bar module 5B is mounted on the stator core 20.

The second holding member 5d includes two fixed portions 5e that protrudes radially outward. The two fixed portions 5e are arranged along the circumferential direction. The fixed portion 5e is fixed to a housing (not illustrated) that houses the motor 1. As illustrated in FIG. 6, the fixed portion 5e protrudes radially outward from the outer edge of the core back 21 when viewed from the axial direction.

According to the embodiment, the phase bus bar module 5A is located above the coil end 30e. That is, the phase bus bars 70, 80, 90 are located above the coil end 30e. The neutral point bus bar module 5B is located on the radial outside of the coil end 30e. That is, the neutral point bus bar 10 is located on the radial outside of the coil end 30e. In the embodiment, the phase bus bars 70, 80, 90 and the neutral point bus bar 10 are separately disposed on the radial outside and upside of the coil end 30e. For this reason, the motor 1 is miniaturized in the axial direction and the radial direction compared with the case where both the phase bus bars 70, 80, 90 and the neutral point bus bar 10 are disposed above the coil end 30e or radially outward.

In particular, in the embodiment, the radial thickness dimension of the neutral point bus bar module 5B disposed on the radial outside of the coil end 30e can be made smaller than the radial thickness dimension of the core back 21. Thus, as illustrated in FIG. 6, the phase bus bar module 5A and the neutral point bus bar module 5B can be prevented from protruding from a projected area in the axial direction of the stator core 20. Consequently, the miniaturization of the motor 1 can be implemented.

According to the embodiment, the phase bus bars 70, 80, 90 disposed in the axial direction with respect to the coil end 30e are disposed with the plate thickness direction of the first main body portions 71, 81, 91 as the axial direction. For this reason, the increase in the axial dimension of the motor 1 is effectively prevented. Furthermore, the neutral point bus bar 10 disposed in the radial direction with respect to the coil end 30e is disposed with the plate thickness direction of the second main body portion 11 as the radial direction. For this reason, the increase in the radial dimension of the motor 1 is effectively prevented.

According to the embodiment, the plurality of phase bus bars 70, 80, 90 of the phase bus bar module 5A are in axially laminated in the first main body portion 71, 81, 91. For this reason, even when the phase bus bar module 5A disposed in the axial direction with respect to the coil end 30e includes a plurality of U-phase bus bars 70, 80, 90, the size in the axial direction is difficult to increase. As a result, the increase in the axial dimension of the motor 1 can be prevented.

The disposition of the phase bus bar module 5A and the neutral point bus bar module 5B with respect to the coil end 30e may be opposite to that of the embodiment. This case will be described as a modification with reference to FIG. 10.

Figure 10:
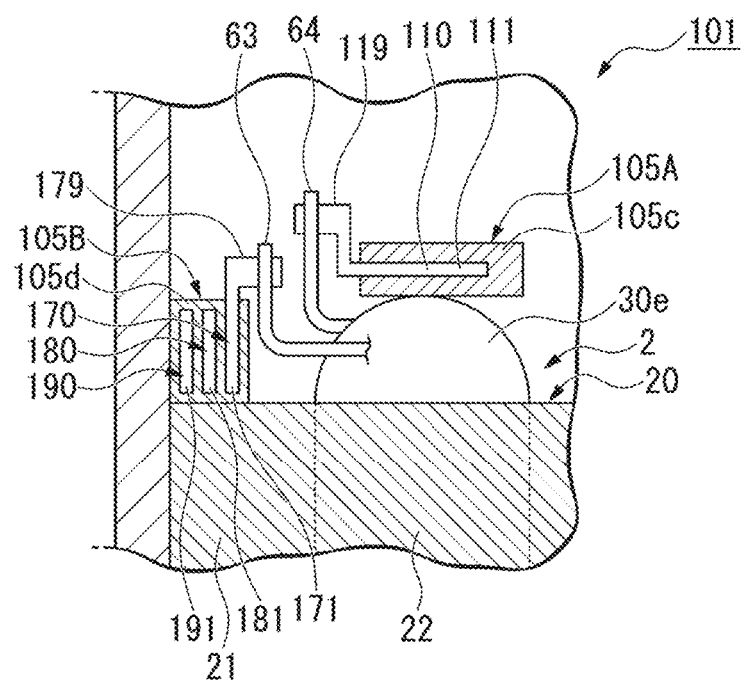
FIG. 10 is a partially sectional schematic view illustrating a motor according to a modification.

FIG. 10 is a sectional schematic view illustrating a part of a motor 101 according to the modification.

As illustrated in FIG. 10, the motor 101 of the modification includes a neutral point bus bar (first bus bar module) 105A and the phase bus bar module (second bus bar module) 105B. The neutral point bus bar module 105A is located above the coil end 30e and the phase bus bar module 105B is located on the radial outside of the coil end 30e.

The neutral point bus bar module 105A includes a neutral point bus bar 110. The neutral point bus bar 110 includes a plate-shaped main body portion 111 in which the axial direction is set to the plate thickness direction and a first terminal portion 119.

On the other hand, the phase bus bar module 105B includes a plurality of (three, in this embodiment) phase bus bars 170, 180, 190. Each of the phase bus bars 170, 180, 190 includes a plate-shaped main body portion 171, 181, 191 in which the radial direction is set to the plate thickness direction and a second terminal portion 179. The plurality of phase bus bars 170, 180, 190 are laminated in the radial direction in the main body portions 171, 181, 191.

According to the modification, the number of bus bars disposed on the radial outside of the coil end 30e is three, and the number of bus bars disposed above the coil end 30e is one. For this reason, the motor 10 that is larger in the radial direction and smaller in the axial direction as compared with the above-described embodiment can be provided. The neutral point bus bar module 105A and the phase bus bar module 105B of the modification are suitably adopted for the motor 101 in which the radial dimension of the core back 21 is relatively large while the space above the coil end 30e is limited.

While embodiments of the present invention and modifications thereof have been described above, it will be understood that features, a combination of the features, and so on according to each of the embodiments and the modifications thereof are only illustrative and not restrictive, and that an addition, elimination, and substitution of a feature(s), and other modifications can be made without departing from the scope and spirit of the present invention. Also note that the present invention is not limited by the embodiment. For example, in the embodiment, the case where the motor is the three-phase motor has been described. However, the motor may be another motor such as a five-phase motor.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a rotor that is rotatable about the center axis line;
a stator disposed on a radial outside of the rotor; and
a first bus bar and a second bus bar that are disposed on one side in an axial direction of the stator,
wherein the stator includes:
a winding portion including a plurality of conductor connection bodies in which a plurality of conductors are connected in series; and
a stator core in which a plurality of slots through which the conductor connection body passes are provided,
the winding portion includes a coil end located on one side in the axial direction of the stator core,
the conductor connection body includes a first end and a second end that are located at an outermost circumference in the radial direction of the coil end,
the first bus bar is connected to the first end,
the second bus bar is connected to the second end,
the first bus bar is located on one side in the axial direction of the coil end, and
the second bus bar is located on the radial outside of the coil end.

2. The motor according to claim 1, wherein
the first bus bar includes a first terminal portion connected to the first end from the radial inside,
the second bus bar includes a second terminal portion connected to the second end from the radial outside, and
the first terminal portion and the second terminal portion are alternately arranged in a circumferential direction.

3. The motor according to claim 2, wherein
the first end and the second end extend to one side in the axial direction and are connected to the first terminal portion or the second terminal portion at upper ends, and
a connection position between the first end and the first terminal portion is located on one side in the axial direction from a connection position between the second end and the second terminal portion.

4. The motor according to claim 1, wherein
the first bus bar includes a plate-shaped first main body portion in which the axial direction is set to a plate thickness direction, and
the second bus bar includes a plate-shaped second main body portion in which the radial direction is set to the plate thickness direction.

5. The motor according to claim 4, further comprising a plurality of the first bus bars,
wherein the plurality of the first bus bars are laminated in the axial direction in the first main body portion.

6. The motor according to claim 1, wherein the conductor connection body includes a folded portion located on an innermost circumference of the coil end.

7. The motor according to claim 6, wherein the winding portion is 4Y-connected by the first bus bar and the second bus bar.

8. The motor according to claim 7, wherein
in a plurality of the conductor connection bodies, two conductor connection bodies in-phase pass through slots adjacent to each other in the circumferential direction,
the first bus bar includes the first terminal portion connected to two in-phase first ends extending from the slots adjacent to each other in the circumferential direction, and
the second bus bar includes a second terminal portion connected to two in-phase second ends extending from the slots adjacent to each other in the circumferential direction.

9. The motor according to claim 8, wherein
the first terminal portion includes two U-shaped first grips that are open while facing each other,
each of the first grips sandwiches the first end in an opening,
the second terminal portion includes two U-shaped second grips that are open while facing each other, and
each of the second grips sandwiches the second end in an opening.

10. The motor according to claim 9, wherein
the first grip and the first end are welded to each other, and
the second grip and the second end are welded to each other.

11. The motor according to claim 1, further comprising an insulating first holding member that holds the first bus bar,
wherein the first holding member includes a plurality of legs that extend to the other side in the axial direction and come into contact with a surface of the stator core facing one side in the axial direction.

12. The motor according to claim 1, further comprising an insulating second holding member that holds the second bus bar,
wherein the second holding member comes into contact with the surface of the stator core facing one side in the axial direction.

* * * * *